United States Patent [19]

Vangor

[11] 3,913,417
[45] Oct. 21, 1975

[54] RING-SHAPED ROTARY INDEX PLATFORMS

[76] Inventor: William Vangor, 325 High Ridge Road, Fairfield, Conn. 06430

[22] Filed: July 22, 1974

[21] Appl. No.: 490,371

[52] U.S. Cl.................... 74/822; 74/122; 74/813 L; 74/827
[51] Int. Cl............................................. B23b 29/32
[58] Field of Search.......... 74/813 L, 820, 822, 827, 74/817, 122, 116

[56] References Cited
UNITED STATES PATENTS

| | | | |
|---|---|---|---|
| 2,757,559 | 8/1956 | Carpenter | 74/820 |
| 3,103,825 | 9/1963 | Bryant | 74/116 |
| 3,724,291 | 4/1973 | Goebel | 74/813 L X |

FOREIGN PATENTS OR APPLICATIONS

| | | | |
|---|---|---|---|
| 405,047 | 7/1966 | Switzerland | 74/820 |

*Primary Examiner*—Samuel Scott
*Assistant Examiner*—F. D. Shoemaker
*Attorney, Agent, or Firm*—Mattern, Ware and Davis

[57] ABSTRACT

Rotationally mounted ring-shaped index dial platforms for sequential production-line operations, container filling and like incremental-step operations are provided with positive latching mechanisms, on the underside of the ring-shaped platform, each of a series of stepping latch blocks is provided with a radially extending indexing face engaging a drive roller mounted upon an unlatching cam, rotatably mounted in an underlying support housing which provides firm rotational support for the ring-shaped index dial platform. The rotation of the unlatching cam automatically retracts the latch mechanism from engagement with one of the latch blocks, freeing the ring-shaped platform for indexing rotation. The drive roller is moved by cam rotation into engagement with the latch block's indexing face. Continuing cam rotation causes orbital movement of the drive roller, indexing the latch block through a predetermined angular sector in Geneva fashion, and bringing the next latch block into latching position, after which the cam releases the retracted latch mechanism for engagement with the newly indexed latch block, providing firm, positive angular positioning of the ring-shaped index dial platform in its new position. Continuing rotation of the cam brings the indexing roller around the newly indexed latch block for engagement with its radially extending indexing face to begin the next indexing operation. The latching and indexing mechanisms are closely juxtaposed to the ring-shaped platform, leaving a large unobstructed central opening free for installation of tooling and delivery of energy, operating fluids or workpieces to the platform.

12 Claims, 4 Drawing Figures

RING-SHAPED ROTARY INDEX PLATFORMS

This invention relates to ring-shaped, incrementally indexed platforms, designed for use in production line operations such as the filling of medication vials in sterile pharmaceutical plants, the filling of cosmetic containers, or for use with automatic production equipment for feeding workpieces to tools. In such operations, containers, parts or workpieces are loaded at one station on the rotary platform, and carried by the platform through a succession of indexed positions. Machining operations, filling, capping or any other production operations are performed sequentially thereon, after which the parts, workpieces or containers are automatically ejected at an unloading station.

More particularly, the rotary index platforms of the present invention are ring-shaped, as compared to the disc-shaped rotary index tables of the prior art. These ring-shaped "dial" platforms incorporate all of the indexing latch blocks required for positive positioning and incremental angular indexing movement, cooperating with latching and indexing mechanisms mounted on the underlying support housing. These ring-shaped rotary index platforms thus afford large unobstructed central access regions within their large internal diameter through which tooling, machining, filling or handling jigs, and mechanisms of many different types may be installed, anchored and driven by automatic actuating mechanisms, and through which energy, operating fluids or supplies may be delivered.

BACKGROUND OF THE INVENTION

Prior Art Rotary Tables

Several different forms of prior rotary index tables manufactured and sold by the Vangor Engineering Corporation of Newtown, Connecticut are disclosed and claimed in my prior U.S. Pat. Nos. 3,309,944 and 3,443,456. These patents show disc-shaped tables indexed through predetermined angular increments by Geneva-type indexing mechanisms incorporating an eccentrically mounted rotating index roller revolving around its eccentric orbit beneath the index table, and coming into engagement with a radially extending indexing surface on an indexing segment mounted on the underside of the rotary index table. The succeeding half-cycle of orbital rotation of the indexing roller drives the indexing segment ahead of the roller, causing the index platform to rotate through a predetermined angular sector of its rotational movement.

In may U.S. Pat. No. 3,309,944, friction brake mechanisms are employed to hold the work table in position between indexing movements. A more positive latching mechanism securing the index table against inadvertent movement between the angular indexing operations is illustrated in FIGS. 4 and 5 of my U.S. Pat. No. 3,443,456, where a pivoted bell crank in the form of a T-shaped lever is angularly pivoted by engagement with an unlatching cam 140, causing unlatching disengagement of a resiliently biased latch slide away from the protruding latch portion of a remote indexing segment, which is spaced apart by several angular index sectors from the last-indexed segment. The use of such a T-shaped bell crank lever 166 to deliver unlatching force from an unlatching cam, through a follower roller, through the T-shaped lever, and through a latching slide to disengage it from a remote indexing segment removed by several sectors from the segment actually delivering the driving indexing force to the rotary index table, inevitably introduces significant and cumulative manufacturing tolerances. Such tolerances are increased by normal wear of these numerous moving parts, introducing increasing play and lack of precision in these rotary index tables, Furthermore, such disc-shaped rotary index tables afford no access through the central support column or pedestal of the underlying support housing through which tooling, lubricants, coolants, filling fluids or electrical power may be delivered to centrally mounted production or filling equipment positioned to overlie the work stations around the movable index table itself.

Objects of the Invention

Accordingly, a principal object of the present invention is to provide novel ring-shaped rotary index platforms capable of incremental angular sector indexing movement while affording unobstructed central access for delivery of working fluids or electrical power, and for the installation and mounting of production or filling equipment.

Another object of the invention is to provide such ring-shaped rotary index platforms incorporating Geneva-type indexing mechanisms cooperating with positive latching means firmly anchoring the ring-shaped platform in each indexed position until the next indexing operation commences. Still another object of the invention is to provide such ring-shaped rotary index platforms incorporating combined latching-indexing blocks each successively engaging cam-driven unlatching and indexing means, producing alternate locking and angular indexing movement of the platform.

A further object of the invention is to provide latching-indexing mechanisms capable of anchoring such ring-shaped rotary index platforms securely in each indexed position, while also providing positive driving force moving the ring-shaped platform angularly through the pre-determined indexing sector into its next indexed and latched position.

Other and more specific objects will be apparent from the features, elements, combinations and operating procedures disclosed in the following detailed description and shown in the drawings.

THE DRAWINGS

SPECIFIC DESCRIPTION

Figure 1:
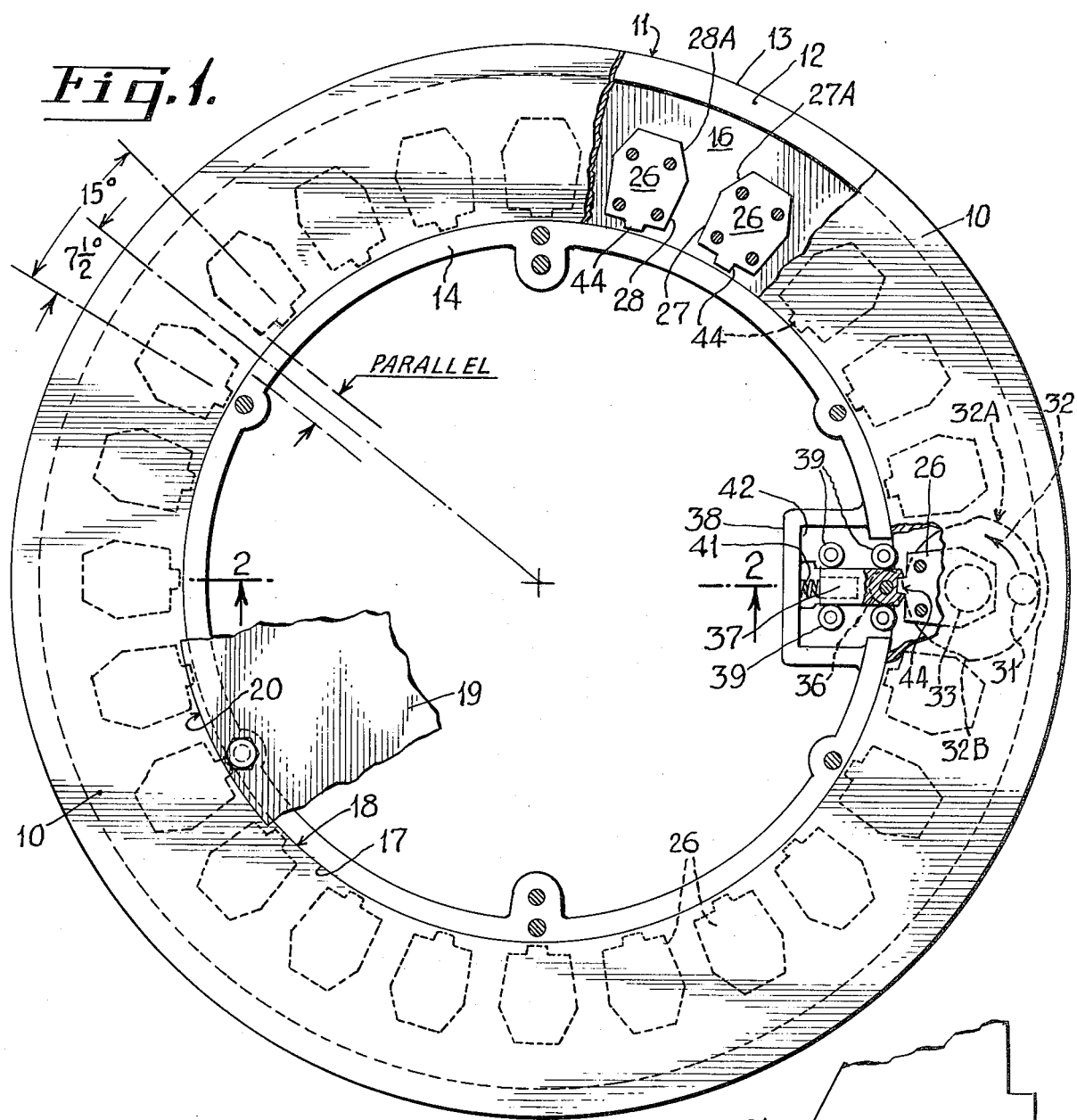
FIG. 1 is a top plan view of a ring-shaped rotary index platform of the present invention, showing its large unobstructed central opening, as well as its underlying support housing and its latching, indexing mechanism.

The structural features and advantages of the present invention are clearly shown in the drawings, where FIG. 1 shows a top plan view of a ring-shaped rotary index platform 10 of the present invention rotatably mounted upon an underlying support housing 11. Ring-shaped rotary index platform 10 is a flat planar ring plate or "dial" formed for example of 0.750 inch thick steel plate, with an inner diameter between 18 and 20 inches and an outer diameter between 27 and 36 inches. The dial or ring-shaped platform 10 has the underside of its outer rim riding upon a flat machined surface forming the upper edge 12 of the outer peripheral flange 13 of the support housing 11.

Figure 2:
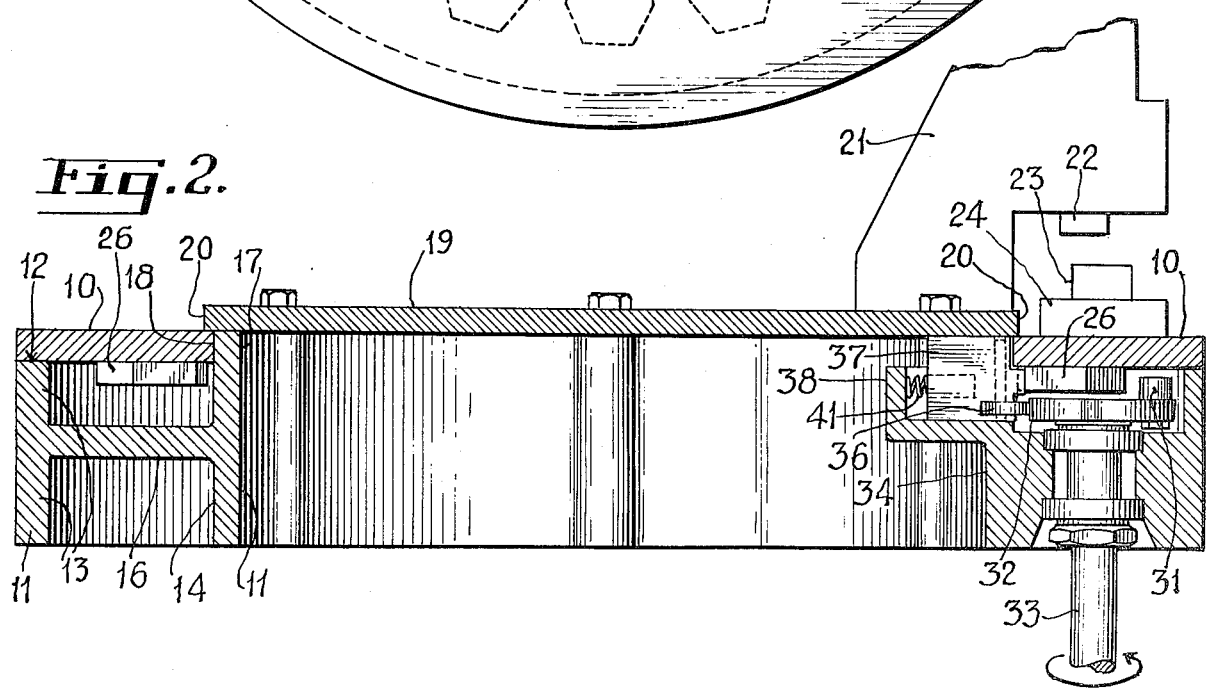
FIG. 2 is a cross-sectional elevation view of the ring-shaped rotary index platform and underlying support housing shown in FIG. 1, taken along the plane 2—2.

The support housing 11 has a substantially H-shaped cross section, shown at the left hand side of FIG. 2, with the outer flange 13 and an inner flange 14 being joined by a central web 16. As shown in FIG. 2, the upper edge 17 of the inner flange 14 of the support housing 11 extends upward inside the inner rim 18 of the dial or ring-shaped platform 10, forming a central hub on which the dial platform 10 is radially positioned and rotatably engaged.

As shown in FIGS. 1 and 2, a large unobstructed, central opening is provided within the housing 11 and the ring-shaped dial platform 10, and the rotatably mounted dial is held captive by an overhanging cap 19 secured by bolts threaded into bolt holes in suitable internal bosses extending inward from the inner wall of inner flange 14 of support housing 11.

The outer peripheral rim 20 of cap 19 overlaps by about 0.250 inches beyond the inner peripheral rim 18 of the platform 10, thus assuring that the dial platform once held in place by bolted cap 19 will remain in the desired, rotatably mounted position on the support housing 11. Cap 19 may be replaced by a raised center platform, or by a center tooling plate, or by an upwardly extending column, and these structures may be used if desired to support central tooling, jigs, dies, filling devices or other production mechanisms. At the right hand side of FIG. 2, a tooling device 21 is shown extending upward from the outer edge 20 of cap 19, incorporating tooling 22 juxtaposed to a workpiece 23 which is held in a suitable jig 24 mounted directly on the upper face of the ring-shaped rotary index dial platform 10. In a similar manner not shown in the drawings, the support housing 11 may be mounted on a pedestal type table base providing a radially extending tooling support surface outside and beneath the housing 11 for positioning additional tooling supports or operating mechanisms outside the periphery of the ring-shaped dial platform 10.

LATCHING-INDEXING BLOCKS

Figure 3:
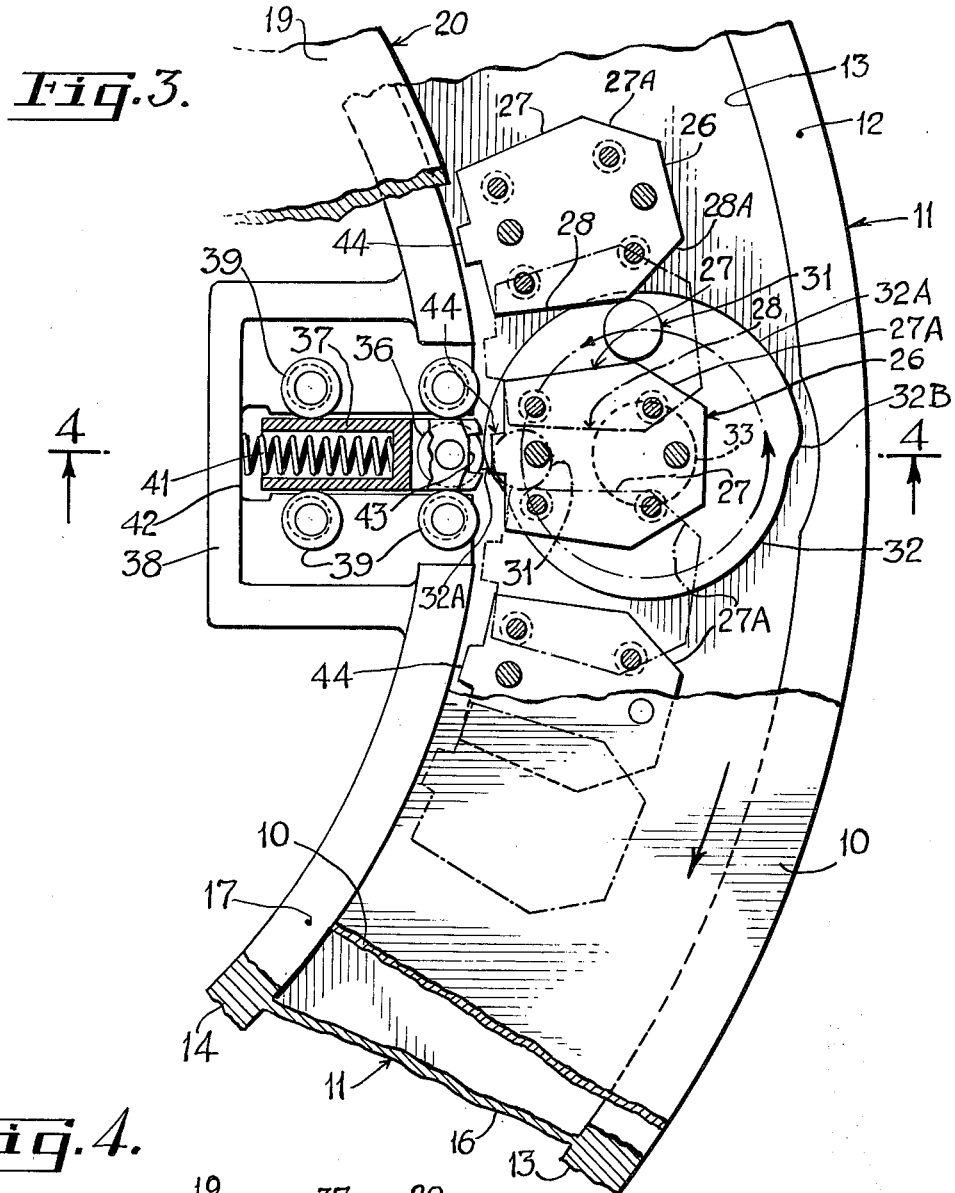
FIG. 3 is an enlarged fragmentary top plan view of the ring-shaped rotary index platform and its latching-indexing mechansim in its unlatched position.

A plurality of 24 latching-indexing blocks 26 are mounted on the underside of the ring-shaped rotary index dial platform 10, as indicated in FIG. 1. The enlarged top plan view of FIG. 3 shows these latching-indexing blocks 26 in more detail. As there shown, each of these latching-indexing blocks 26 is provided with substantially radially extending indexing faces, a clockwise face 27 for driving the ring-shaped dial platform 10 in a clockwise direction and a counterclockwise indexing face 28 for driving the ring-shaped dial platform 10 in a counterclockwise direction if the direction of rotation of cam 32 is reversed.

From an examination of FIGS. 1 and 3 it will be noted that the center lines of each pair of adjacently arrayed latching-indexing blocks 26 subtend angles of 15° in the embodiment there illustrated. The facing indexing surfaces 27 and 28 of adjoining blocks are substantially parallel to each other, and each indexing surface of each index block converges toward the radial center line of that block at an acute angle of 7½°. Accordingly the facing indexing surfaces of adjacent segments are substantially parallel both to each other and to a 7½° bisector of the 15° angle between the radial center lines of each two adjacent blocks, as shown in the upper left hand portion of FIG. 1.

Figure 4:
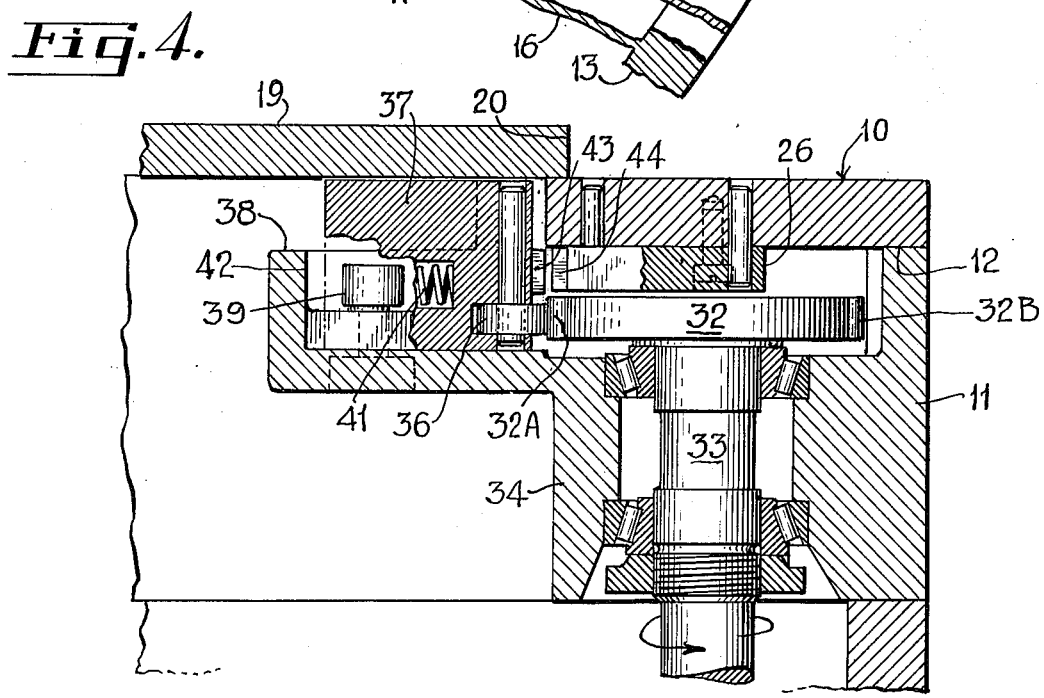
FIG. 4 is a corresponding enlarged fragmentary cross-sectional elevation view of the ring-shaped rotary index platform, the underlying support housing and the latching-indexing mechanism shown in FIG. 3, taken along the plane 4—4.

The resulting space between adjacent blocks forms a radial Geneva cam track dimensioned to receive a drive roller 31 having an outer rotatable bushing mounted on a threaded stud anchored to a rotating unlatching cam 32, as shown in FIGS. 1 and 3. Cam 32 is mounted on a vertical shaft 33 rotatably mounted in tapered roller bearings secured in a bearing housing portion 34 of the support housing 11, as shown in FIGS. 2 and 4.

DIAL LOCKING AND UNLATCHING

The cam 32 is provided with an unlatching high dwell sector 32A shown around the upper portion of the periphery of cam 32 in FIG. 3, where the counterclockwise rotation of cam 32 is bringing the initial rise leading to the this high dwell unlatching sector 32A into engagement with a follower roller 36 rotatably mounted in a slidingly retractable latching slide 37.

The slide 37 is positioned for radial translation movement within a latch housing 38 forming a cup-shaped radial inward extension of the inner flange 14 of support housing 11 at a point radially aligned with the center line of the bearings supporting cam shaft 33. Slide 37 is adjustably positioned between two pairs of eccentric stud cam follower rollers 39, which may for example be "Camrol" series CFE-SB eccentric stud cam followers made and sold by the McGill Manufacturing Company Inc., Bearing Division of Valparaiso, Indiana. Four of these eccentric stud cam follower rollers 39 are positioned in pairs flanking the slide 37 with their threaded studs anchored in the bottom wall of the latch housing 38.

As shown in FIG. 3, the slide 37 is provided with an inwardly-facing radial recess entrapping a compression coil spring 41 between the blind end of this recess and the facing inner wall 42 of the latch housing 38. Being normally compressed, spring 41 urges slide 37 toward cam 32, bringing follower roller 36 into engagement with the rim of cam 32.

Slide 37 is provided with a latch recess 43, shown at its right hand end in FIG. 3, facing a latching projection 44 extending radially inward from the inner end of each index block 26.

As indicated in FIG. 3, the unlatching high dwell sector 32A of cam 32 engages follower roller 36, resiliently depressing slide 37 radially inward toward the central axis of the dial platform 10, i.e. toward the left in FIG. 3. This leftward sliding movement disengages latching recess 43 from the latching projection 44 of the engaged latching-indexing block, which is thereby disengaged from the angular locking mechanism, freeing dial platform 10 for rotational movement around the hub formed by the upwardly extending edge portion 17 of inner flange 14.

INDEXING MOVEMENT OF RING-SHAPED DIAL PLATFORM

As shown in solid lines in FIG. 3, the arrival of the initial rise bringing unlatching high dwell sector portion 32A of cam 32 into engagement with roller 36, to depress slide 37 to its unlatched position, coincides with the arrival of the drive roller 31 in the outer entrance end of the cam track defined by counterclockwise index surface 28 of indexing block 26 and the facing index surface 27 of the preceding indexing block 26 shown in the upper portion of FIG. 3. Latching projection 44 has just been disengaged by the withdrawal of latching recess 43.

Continuing rotation of the cam 32 in the counterclockwise direction shown in the top plan view of FIG. 3 by the rotational arrows appearing on cam 32 in this view causes the drive roller 31 to move radially inward along the cam track 27-28, bringing drive roller 31 into abutting engagement with clockwise index face 27. The drive roller 31 continues around its orbital path about the center axis of shaft 33, urging indexing block 26 and the ring-shaped dial platform 10 to which the block 26 is bolted in a clockwise direction toward the dash line positions shown in FIG. 3. At this dash line position, the drive roller 31 is close to the innermost end of the Geneva cam track formed by the facing surfaces 27 and 28. Continuing its orbital revolution about the axis of cam 32 and shaft 33, drive roller 31 continues to urge indexing block 26 in a clockwise direction, downward in FIG. 3, until the drive roller 31 reaches the outer end of the cam track between the two facing index faces 27 and 28, at which point the terminal fall 32B ending the high dwell sector 32A reaches the follower roller 36. The passage of this fall sector 32B of cam 32 releases the compressed spring 41, urging the slide 37 radially outward to the right in FIG. 3, bringing recess 43 into engagement with the latching projection 44 of the newly indexed block 26 as drive roller 31 moves radially outward from between the two index faces 27 and 28.

Beveled or chamfered portal portions 27A and 28A of the faces 27 and 28 diverge radially outward, assuring that drive roller 31 will be free to complete the remaining outermost portion of its orbital movement around the outer end of the newly indexed block 26 without interfering contact with the outer portion of that segment, as can be clearly seen in FIG. 3.

The use of adjustable roller-bearing guide rollers 39 such as McGill "Camrol" eccentric stud rollers, provides unusually high precision indexing movement. By eccentric adjustment of rollers 39, clearances between rollers 39 and slide 37 may be reduced to zero, cancelling manufacturing tolerances. Further eccentric adjustment "beyond zero" imposes slight compressive loads and deformations on rollers 39 and their roller bearings. Such loads are well below the elastic limit or yield point, and no permanent deformation occurs, but sliding accuracy far closer than manufacturing tolerances is the result.

In addition, play between moving parts for clockwise indexing of dial 19 can be counteracted in one eccentric adjusted position of rollers 39, and counterclockwise play can be similarly counteracted by opposite eccentric adjustment of rollers 39.

FIG. 1 clearly shows the compactness of the latching-indexing lock and the associated indexing mechanisms directly juxtaposed beneath the ring-shaped dial platform 10. The unlatching-indexing cam 32 is preferably positioned entirely beneath the ring-shaped dial 10, while the resiliently biased latch slide 37 and its latch housing 38 protrude only slightly into the large central opening within the ring-shaped dial 10. Thus virtually the entire central opening inside the ring-shaped dial platform 10 is made available by the devices of the present invention for tooling supports 21, as shown in FIG. 2, and for all types of associated systems such as the supply of fluids or electrical power, the delivery of workpieces and the like.

Blocks 26 can be cast or molded integral with dial platform 10 if desired, but for simplicity and economy of fabrication and minimum finishing machining operations, separately-machined blocks 26 bolted to the underside of dial platform 10 are preferred, as shown in the drawings.

While cap 19 is shown in FIGS. 1 and 2 as a single flat plate, it may be apertured or cut away in any manner required for the mounting and installation of such tooling supports and associated systems, without interfering with the firm locking of dial 10 in each successive indexed position, or with its intermittent angular indexing movement.

By employing the unlatching-index cam 32 to provide this dual-function actuation of the device, close tolerances may be achieved and maintained over a long useful life. Cam actuation of slide 37 by the high dwell sector 32A of cam 32 automatically releases the latching-indexing block 26 abutting drive roller 31 for immediate indexing movement. No intervening parts, linkages, bell cranks or friction brakes are required, and the cumulative compounding of initial manufacturing tolerances and wear tolerances developing over the life of the device are eliminated.

This automatic resilient locking of a Geneva follower, combined with its automatic unlatching by the Geneva cam-drive roller, are believed to be unique, and the incorporation of this latching-indexing block mechanism, actuated by a single unlatching indexing cam 32, provides high precision and reliability for heavy duty production line index platforms of the kind illustrated in the drawings.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A rotary index platform assembly comprising
A. a support housing,
B. a planar platform rotatably mounted on the support housing for movement in its own plane about a rotation axis perpendicular to that plane,
C. a plurality of arrayed latching-indexing blocks extending from the platform, each having a protruding latching projection, and at least one substantially radially extending indexing surface intersecting the plane of the platform,
D. a resiliently-biassed latch on the support housing normally embracing the latching projection of one block, and movable to a disengaged position clear of said projections, E. and a revolving unlatching-indexing cam rotatably mounted in the support housing adjacent to the latch and having a dwell sector oriented to move the latch to its disengaged position and a protruding drive roller positioned to engage said indexing surface for rotatable driving index movement of the platform, while the dwell sector maintains the latch in its disengaged position, over a sector of cam revolution dimensioned to move the latching projection of the next adjacent block into engageable alignment with the latch.

2. The rotary index platform assembly defined in claim 1 wherein the planar platform is ring-shaped, with a substantial proportion of its planar area comprising an unobstructed central aperture, and wherein the latching-indexing blocks and the unlatching-indexing cam are closely juxtaposed to the ring-shaped platform, not obstructing the central aperture.

3. The rotary index platform assembly defined in claim 2 wherein the unobstructed central aperture comprises a major proportion of the planar area of the ring-shaped planar platform.

4. The rotary index platform assembly of claim 2 wherein the blocks and the cam are both positioned within the support housing beneath the rotatably mounted ring-shaped platform.

5. The rotary index platform defined in claim 4 wherein the latch is positioned radially inward adjacent to the blocks, and wherein the cam's dwell sector is exposed inwardly to disengage the latch while the cam's drive roller travels through the radially innermost portion of its orbit nearest to the platform's axis of rotation to produce angular indexing movement of the platform.

6. The rotary index platform assembly of claim 1 wherein the latching-indexing blocks each have two substantially radially extending indexing surfaces, each of which is juxtaposed to and spaced apart from a facing indexing surface of the next adjacent block by a distance closely accommodating the cam's drive roller, thereby forming a cam track restraining the platform against undesired play and backlash movement during indexing.

7. The rotary index platform assembly defined in claim 6 wherein the cam track is radially positioned to coincide with a sector of the orbital path of the cam's drive roller comprising less than one half of its total path length, and wherein the indexing surfaces are provided with diverging portal portions providing unobstructed clearance for the drive roller over the remaining return portion of its orbital path.

8. The rotary index platform assembly defined in claim 7 wherein the resiliently biassed latch and the revolving unlatching-indexing cam are radially arrayed, with the cam's drive roller being aligned with the cam track and portal portions of the latching-indexing blocks for both clockwise and counterclockwise reversible-indexing actuation of said platform, depending upon the direction of revolution of said cam.

9. The rotary index platform assembly defined in claim 1 wherein the resiliently biassed latch is formed as a slide adjustably positioned by eccentric-stud supported adjustable rollers mounted in a latch housing forming part of the support housing, resiliently urged toward the closest latching-indexing block by a compression coil spring compressed between the latch and the latch housing.

10. The rotary index platform assembly defined in claim 9 wherein the rollers are mounted in the latch housing on adjustable eccentric studs positioned for angular adjustment between roller-clearing juxtaposition with said slide and roller-interfering engagement with said slide, whereby said studs provide adjustment capability for substantially complete cancellation of manufacturing tolerances, producing high-precision alignment of said slide.

11. The rotary index platform assembly defined in claim 10 wherein said roller-interfering engagement with said slide produces pre-loaded elastic stress mildly deforming said rollers, cancelling play between rollers and slide.

12. The rotary index platform assembly defined in claim 10 wherein said rollers flank said slide, permitting said roller-interfering engagement to be achieved alternatively on either the clockwise or the counterclockwise side of said slide, whereby counterclockwise play may be cancelled in one adjusted position of said rollers, and clockwise play may be cancelled in another adjusted position thereof.

* * * * *